March 26, 1935.　　　G. E. GENUNG　　　1,995,919
TILT INDICATOR
Filed June 8, 1933　　　2 Sheets-Sheet 2

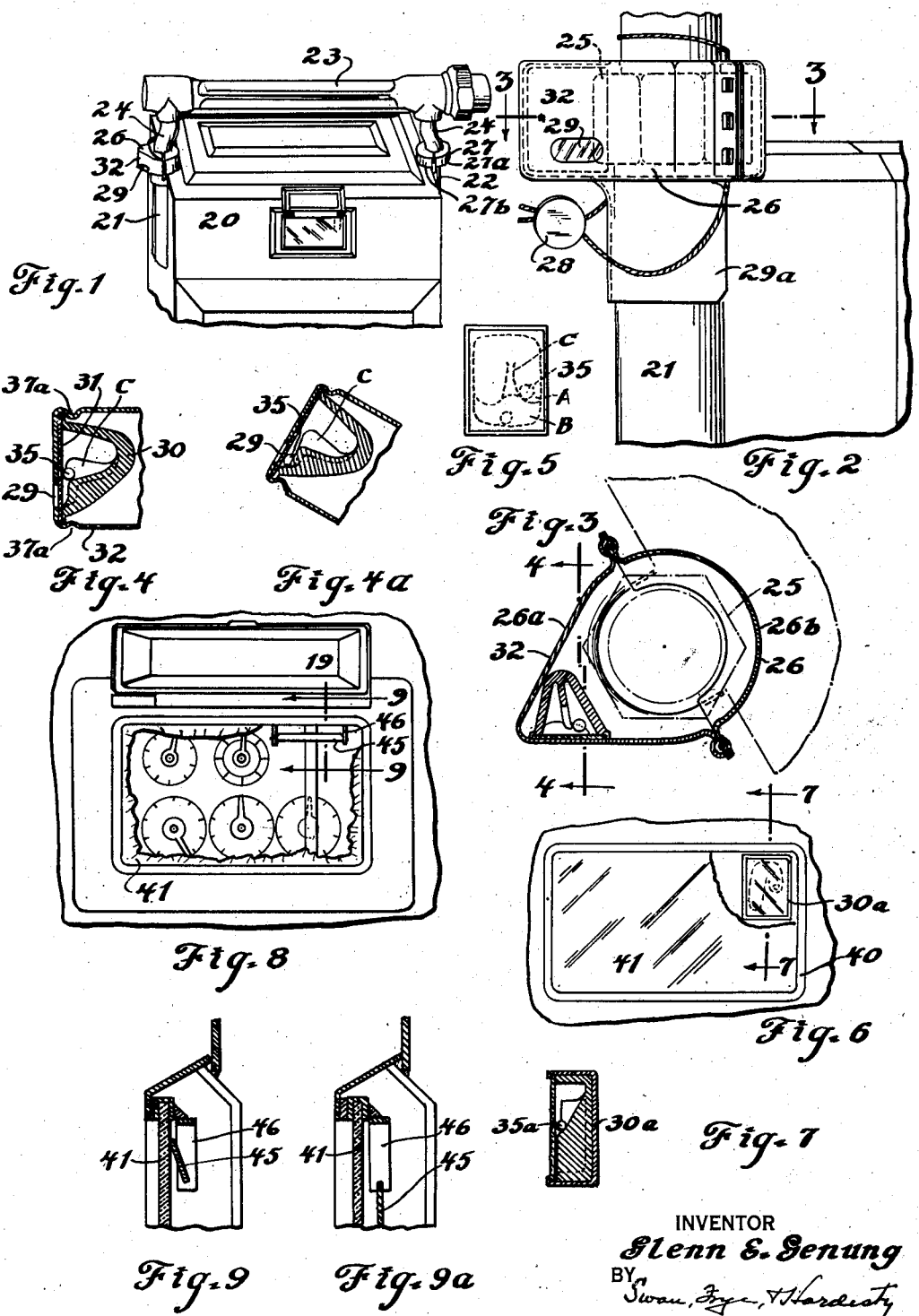

INVENTOR.
Glenn E. Genung
BY
ATTORNEY.

Patented Mar. 26, 1935

1,995,919

UNITED STATES PATENT OFFICE 1,995,919

TILT INDICATOR

Glenn E. Genung, Detroit, Mich.

Application June 8, 1933, Serial No. 674,882

8 Claims. (Cl. 116—114)

The present invention relates to devices for detection of the tipping or tilting of other mechanisms, and specifically to tilt indicators for gas meters.

The conventional gas meter, and there are of course other mechanisms having the same characteristic, is so constructed that, although it functions properly when properly placed in an upright position, if tilted or tipped more than a few degrees from the vertical, does not act as it should. Further, if the meter or other mechanism is tilted and subsequently restored to its proper upright position, there is no indication of such tipping or tilting having occurred.

Among the objects of the present invention therefore is means to provide an indication of such tipping or tilting.

Another object is means to provide an easily visible indicator of tilt and one that requires removal of parts in order to restore the indicator, thereby securing permanence of the indication, at least until a properly authorized restoration is made.

Other objects will readily occur to those skilled in the art upon reference to the following description and the accompanying drawings in which Figure 1 is a partial perspective view of a gas meter with the tilt indicator in position.

Figure 2 is a front elevation of the indicator and housing on an enlarged scale and showing a portion of a meter.

Figure 3 is a horizontal section on line 3—3 of Figure 2.

Figure 4 is a vertical section of the indicator as if on line 4—4 of Figure 3.

Figure 4a is a view similar to Figure 4 but showing the indicator in a different position.

Figure 5 is a front elevation of the indicator.

Figure 6 is a front elevation of the meter dial housing showing a modified form of indicator.

Figure 7 is a section on line 7—7 of Figure 6.

Figure 8 is a front elevation of the dial housing showing another form of indicator.

Figures 9 and 9a are sections on line 9—9 of Figure 8 showing two positions of the indicator.

Figures 10, 11, 11A:
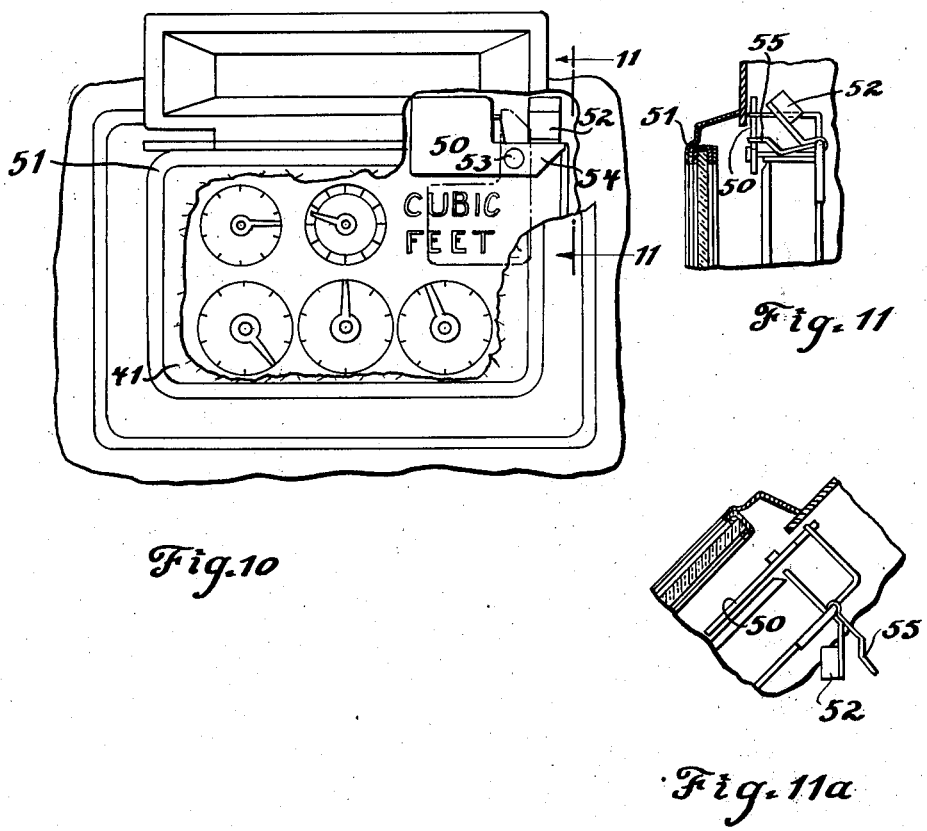
Figure 10 is a front elevation of yet another form of indicator.
Figures 11 and 11a are sections on line 11—11 of Figure 10 showing this form of device in two positions.

In the drawings a conventional gas meter is indicated at 20 being provided with the usual inlet and outlet conduits 21 and 22 respectively, adapted to be secured to the meter connection 23 forming part of the permanent plumbing installation. The leads to the meter from connection 23 are short pipes 24 screwed into the connection and fixed to the meter by couplings, one of which is indicated at 25, which couplings are then covered by housings 26 and 27 fixed in place and sealed as at 28 to prevent unauthorized disturbance.

These housings are shown as formed of two parts 26a and 26b, and 27a and 27b, the latter three being identical in form while part 26a is of special form, being provided with a lateral enlargement 32 in which is a small window 29 and also with a depending half sleeve 29a extending partly around inlet conduit 21 to prevent turning the housing after installation.

The preferred form of the tilt indicator is illustrated in Figures 2 to 5 and consists of a small casing 30, roughly pyramidal in form and hollow with its base open and covered with a sheet 31 of transparent material—glass, mica, or the like—which casing is adapted to fit into suitable guides 37a in the enlargement 37, upon housing 26, before window 29. In this hollow casing 30 is a small ball or bead 35 of suitable non-magnetic material preferably of a color which contrasts with the inside of the casing.

It will be noted from Figures 3 to 5 that the walls of the space in casing 30 are of such form that ball 35 may rest in either of two positions, that of Figure 4 or that of Figure 4a. In the latter position it is visible through window 29 while in that of Figure 4 it is above the window. These walls are formed to provide two pockets A and B divided from each other by a septum C and having their floors sloping upward toward the rear, as indicated best in Figures 4 and 4a, to the top of septum C and with the floor of pocket A inclined toward that of pocket B. Further, the floor of pocket B does not slope upward directly from the bottom thereof but from a point above the bottom so as to provide a sort of trap to retain the ball against displacement by tapping the glass or mica front 31.

The angle of slope of the floor of pocket B is not of great consequence but the angle of slope of the floor of pocket A should be not less than about 25° from the vertical and it is preferred to make such angle over 45° and up to 60° or even 75° from the vertical, to provide for detection of tilting of the meter through an angle of 15° or more. Of course, an angle of the floor of pocket A may be even more nearly horizontal and arranged to detect tilting of even 1° if desired.

With the indicator as described, tilting the meter will result in rolling the ball 35 out of pocket A into the rear of pocket B and subsequently returning the meter to the vertical will cause the ball to drop into the front of pocket B where it will be visible through window 29 and not returnable without detaching the housing 26.

The tilt indicator of Figures 6 and 7 is much the same as that already described but is modified to permit mounting behind the dial glass. In this form the casing 30a is of small depth and the chamber containing ball 35a correspondingly modified. As shown, this form is secured in place in the dial housing 40 behind the glass cover 41 and visible therethrough.

The operation is substantially the same as that of Figures 1 to 5 but resetting necessitates the removal of the meter.

Another simple form of indicator as shown in Figures 8, 9 and 9a, consists of a metal strip 45 of trapezoidal or other suitable shape hingedly mounted in supports 46 behind the dial glass 41 and ordinarily in the position shown in Figure 9, in which it is swung up and rests against glass 41 at a small angle to the vertical. If the meter is tilted, the strip is moved over beyond the vertical and immediately drops to the position shown in Figure 9a. It is preferred to color that face of strip 45 exposed in the position of Figure 9a, some bright contrasting color, such as red, in order to increase visibility.

Still another form of indicator as shown in Figures 10, 11 and 11a may consist of a flag 50, ordinarily maintained in a raised position hidden from sight behind the dial housing 51, by means of a weighted lever 52. The flag is pivoted at 53 and has an extension 54 coacting with a portion 55 of lever 52. When, however, the meter is tilted, the weight on lever 52 causes the lever to swing out of the path of portion 54 to the position of Figure 11a and permit the flat to drop to the dotted line position of Figure 10, in which it is clearly visible through glass 41.

Now having described the invention and the preferred embodiment thereof, it is to be understood that said invention is to be limited, not to the specific details herein set forth, but only by the scope of the claims which follow:

What I claim is:

1. A tilt indicator for a meter or the like comprising a casing adapted to be secured in a fixed position relative to said meter, a freely movable element in said casing, said casing being provided with means defining two rest positions for said element said defining means including bottom walls arranged at an angle to the vertical whereby said element remains at rest until the casing is tilted and means for trapping said element in one of the two positions.

2. In a tilt indicator, a casing, a rollable telltale element therein, and supporting and runway portions for said element within the casing and defining two rest position pockets connected by runway portions, both of said pockets being at the foot of the runway portions when the device is in upright position, and guiding means for directing the telltale member into a different one of said pockets whenever the device is returned to upright position after having been tilted sufficiently to displace the telltale from a pocket in which it is initially positioned.

3. In a tilt indicator, a casing, a rollable telltale element therein, and supporting and runway portions within the casing including two rest position pockets, a plurality of interconnected runways, one of which terminates at each of said pockets, each pocket being at the foot of a runway portion when the device is in proper upright position, and blocking and guiding means defining a portion of said runway system for directing the telltale to a different pocket and preventing its return to the first whenever the device is returned to upright position after having been tilted sufficiently to displace the telltale from that pocket in which it is initially placed.

4. In a tilt indicator, a casing, a rollable telltale element therein, and supporting and runway portions within the casing and including an initial rest position pocket within which the telltale may be positioned, a runway for the telltale connected to the pocket and down which the telltale may run when the device is tilted, the pocket being at the foot of the runway when the device is in proper, upright position, and a blocking portion for preventing return of the telltale to said pocket upon re-righting the device after tilting it sufficiently to displace the telltale from the pocket.

5. A combined coupling housing and tilt indicator for gas meters comprising a sheet metal coupling housing having fixed therein means for indicating meter tilting and provided with means coacting with meter structure to prevent improper manipulation of said housing.

6. In a coupling housing, an enlarged portion providing a chamber having a window therein, a tilt indicator, and means in said housing for fixing in position before said window said tilt indicator.

7. In a coupling housing, a laterally extending enlarged portion having a chamber therein with a window in one wall thereof, a tilt indicator housed in said enlarged portion and having means, observable from outside of said chamber, to indicate whether or not said chamber and coupling have been tilted.

8. In combination with a gas meter having a housing provided with means permitting envisioning of an object within said housing, a tilt indicator within said housing and provided with a movable element, said indicator being so arranged that said element is normally invisible from without but movable through tilting of said meter to a position so as to be visible through said means.

GLENN E. GENUNG.